(12) United States Patent
Blossfeld et al.

(10) Patent No.: US 8,803,680 B2
(45) Date of Patent: Aug. 12, 2014

(54) TIRE PRESSURE MONITORING APPARATUS

(75) Inventors: Mike Blossfeld, South Lyon, MI (US); John Scales, Ann Arbor, MI (US)

(73) Assignees: TRW Automotive U.S. LLC, Farmington Hills, MI (US); Michelin Recherche et Technique S.A., Granges-Paccot (CH)

( * ) Notice: Subject to any disclaimer, the term of this patent is extended or adjusted under 35 U.S.C. 154(b) by 734 days.

(21) Appl. No.: 11/820,926

(22) Filed: Jun. 21, 2007

(65) Prior Publication Data

US 2007/0295076 A1    Dec. 27, 2007

Related U.S. Application Data

(60) Provisional application No. 60/815,357, filed on Jun. 21, 2006.

(51) Int. Cl.
*B60C 23/00* (2006.01)

(52) U.S. Cl.
USPC ............ 340/442; 73/146; 73/146.3; 73/146.5

(58) Field of Classification Search
USPC ........... 340/442, 438, 425.5; 73/146.8, 146.3, 73/146.2, 146; 116/34 R, 28 R; 152/152.1, 152/151

See application file for complete search history.

(56) References Cited

U.S. PATENT DOCUMENTS

| | | | |
|---|---|---|---|
| 5,956,820 A | 9/1999 | Albinski | |
| 6,163,255 A | 12/2000 | Banzhof et al. | |
| 6,568,259 B2 | 5/2003 | Saheki et al. | |
| 6,722,409 B1 | 4/2004 | Martin | |
| 6,739,187 B2 | 5/2004 | Luce | |
| 6,799,455 B1 | 10/2004 | Neefeldt et al. | |
| 6,805,001 B2 | 10/2004 | Luce | |
| 6,862,929 B2 | 3/2005 | Luce | |
| 6,865,932 B2 | 3/2005 | Luce | |
| 6,895,810 B2 | 5/2005 | Saheki et al. | |
| 6,912,897 B2 | 7/2005 | Luce | |
| 7,017,403 B2 * | 3/2006 | Normann et al. | 73/146.2 |
| 7,040,155 B1 | 5/2006 | Lundell et al. | |
| 2003/0079537 A1 | 5/2003 | Luce | |
| 2003/0201883 A1 * | 10/2003 | Saheki et al. | 340/445 |
| 2004/0034454 A1 * | 2/2004 | Ito et al. | 701/1 |
| 2004/0163456 A1 * | 8/2004 | Saheki et al. | 73/146.8 |
| 2004/0163470 A1 * | 8/2004 | Babala et al. | 73/514.01 |
| 2005/0087007 A1 * | 4/2005 | Uleski | 73/146 |
| 2005/0104788 A1 * | 5/2005 | Hung et al. | 343/702 |
| 2005/0231067 A1 * | 10/2005 | Cook et al. | 310/313 R |

* cited by examiner

*Primary Examiner* — Brent Swarthout

(74) *Attorney, Agent, or Firm* — Tarolli, Sundheim, Covell & Tummino LLP

(57) ABSTRACT

A tire pressure monitoring apparatus (10) includes a pressure transducer (14) and a valve stem (12). A support bracket (50) connects the valve stem (12) to the pressure transducer (14) and facilitates pivotal movement between the valve stem and the pressure transducer. The support bracket (50) includes a valve stem biasing member (80) that exerts a spring bias on the valve stem (12) to help maintain a selected angular position of the valve stem relative to the pressure transducer (14).

14 Claims, 6 Drawing Sheets

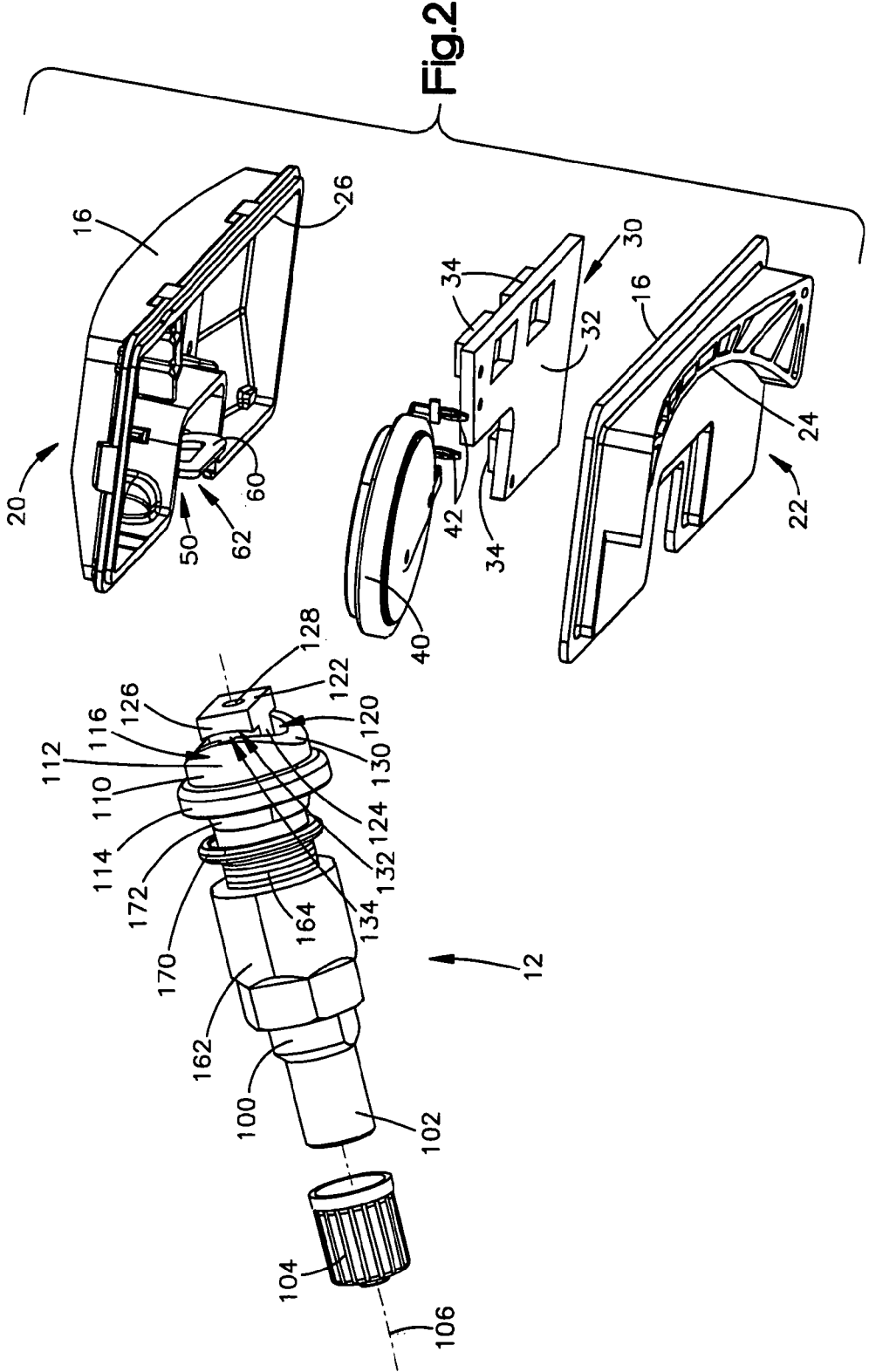

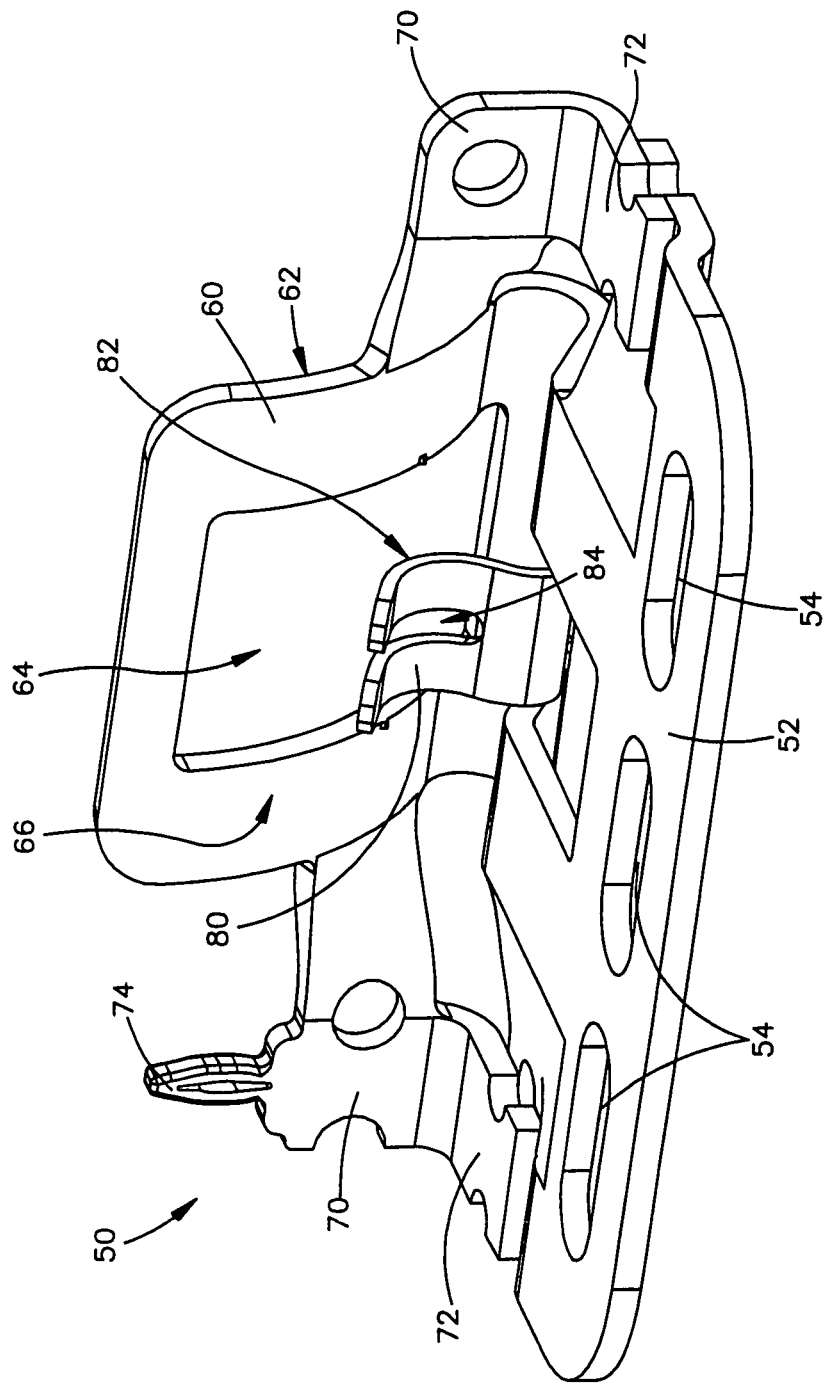

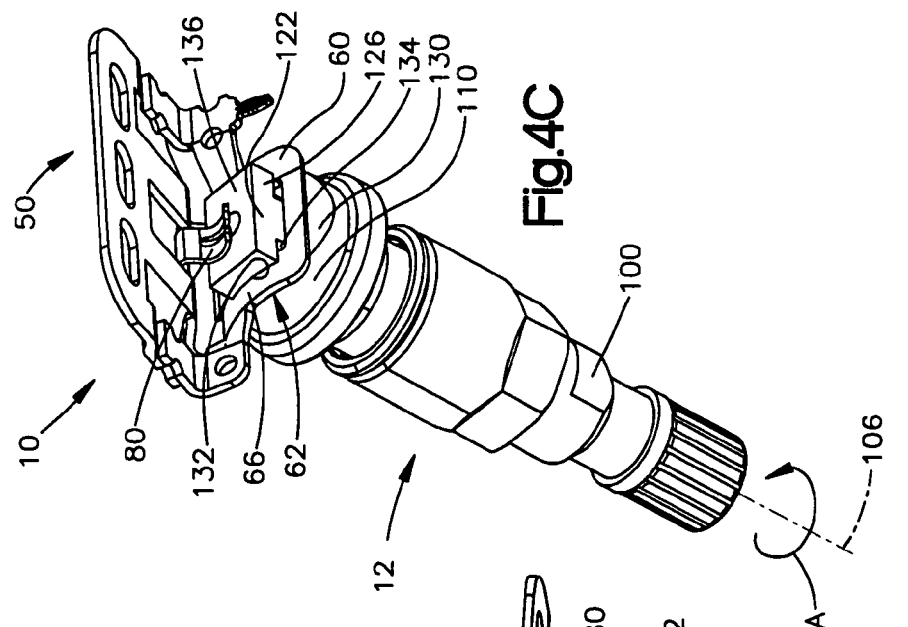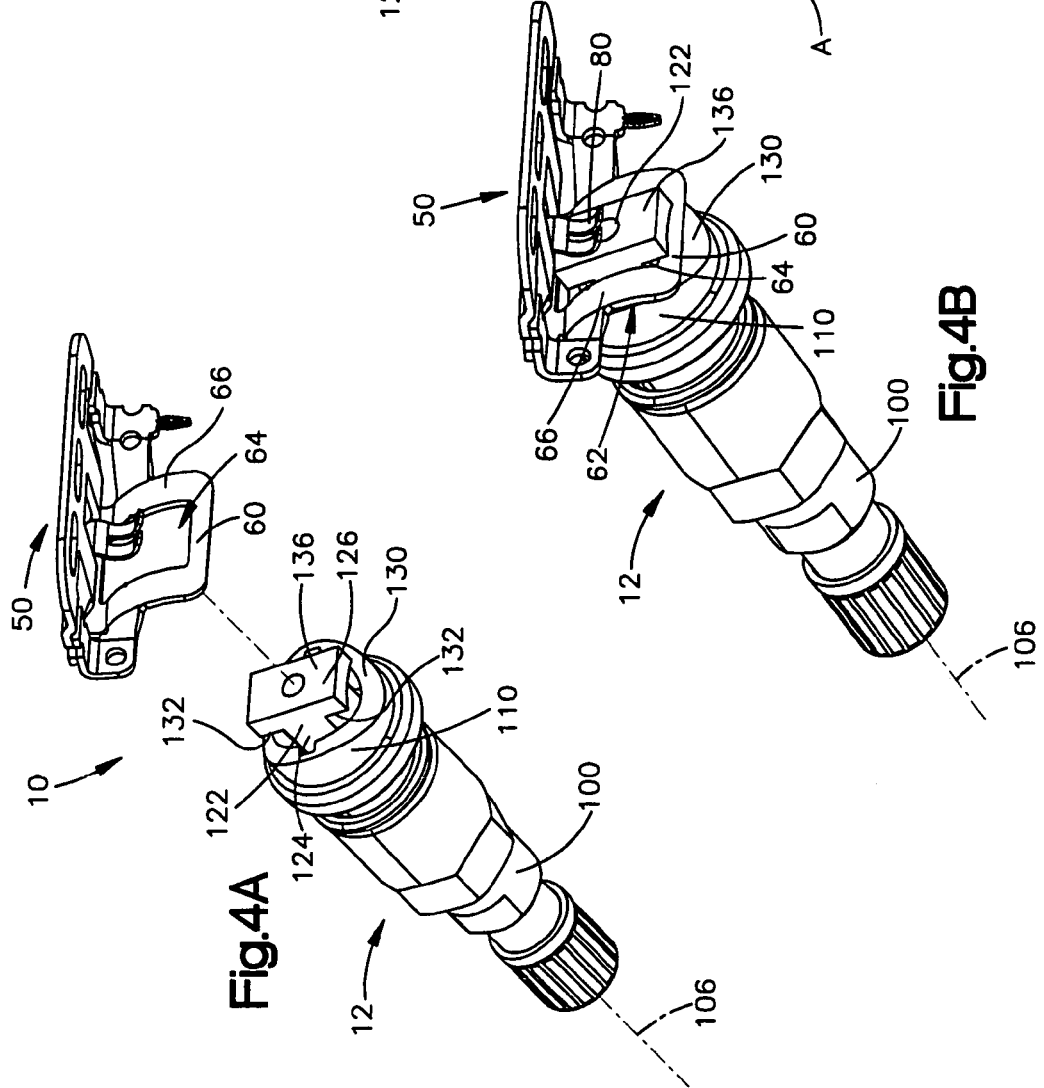

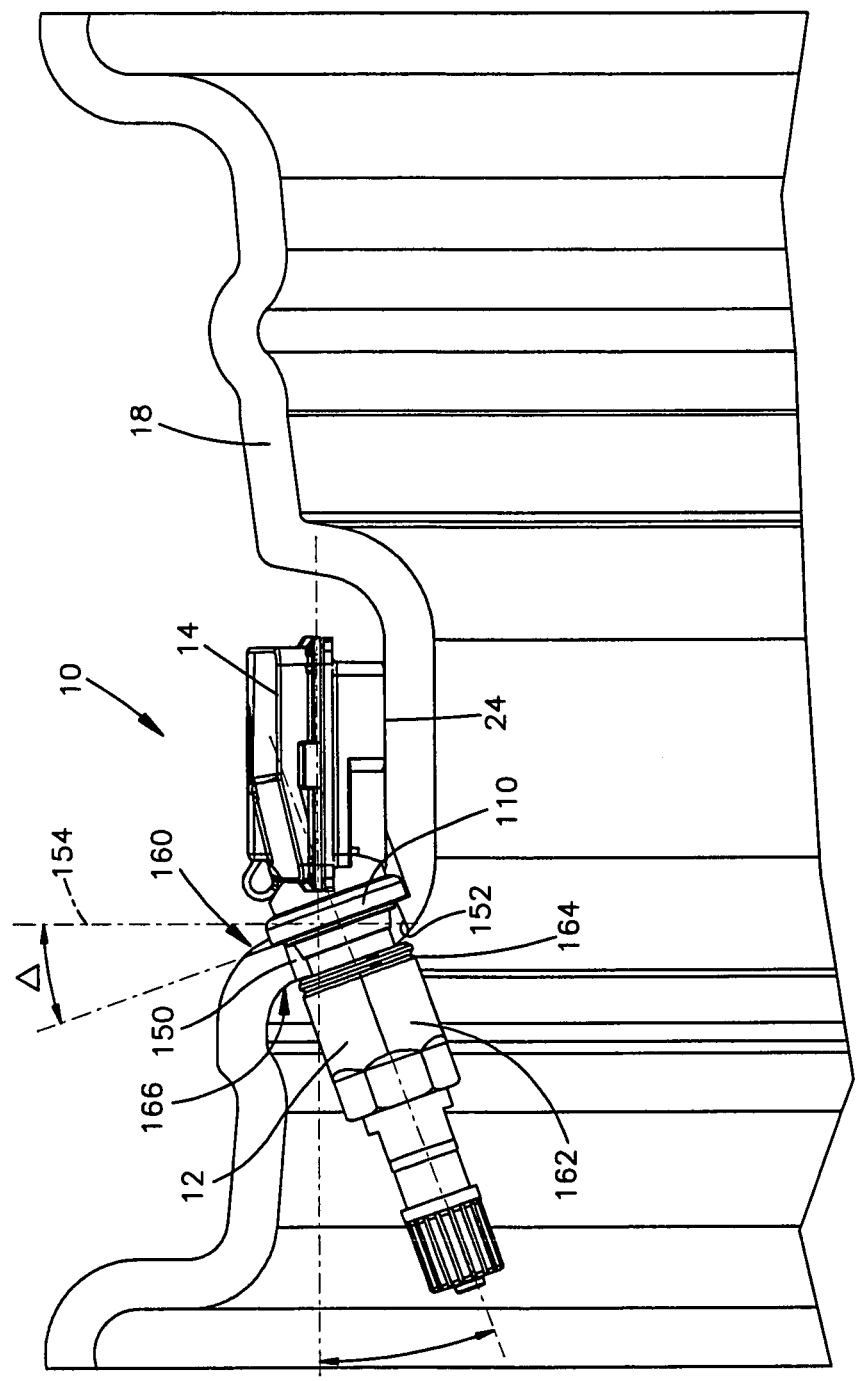

TIRE PRESSURE MONITORING APPARATUS

RELATED APPLICATION

This application claims the benefit of U.S. Provisional Application Ser. No. 60/815,357, filed Jun. 21, 2006.

TECHNICAL FIELD

The present invention relates to a tire pressure monitoring apparatus and, in particular, relates to a unitized tire pressure monitoring apparatus with features that facilitate installation on various vehicle wheel configurations.

BACKGROUND OF THE INVENTION

Tire pressure monitoring ("TPM") systems are known in the art. There have been several mounting arrangements proposed for these TPM systems and apparatuses. Some of the proposed mounting arrangements are shown in U.S. Pat. No. 6,163,255, No. 6,722,409, No. 6,568,259, and No. 6,799,455.

The automotive industry is driving to reduce the number of part numbers used for vehicle assembly. The industry is also attempting to reduce labor in plants and cost from suppliers for purchased assemblies. TPM sensors are rapidly becoming a commodity, and OEMs are attempting to use one part for multiple platform applications with simplified assembly while maintaining current assembly processes. The challenge for the TPM sensor is providing a single TPM sensor configuration that is capable of being mounted rigidly to a wide range of wheel rim thicknesses and configurations, while maintaining the current valve design and continued sealing performance over high speeds.

SUMMARY OF THE INVENTION

The present invention relates to a tire pressure monitoring apparatus. The tire pressure monitoring apparatus includes a pressure transducer and a valve stem. A support bracket connects the valve stem to the pressure transducer and facilitates pivotal movement between the valve stem and the pressure transducer. The support bracket includes a valve stem biasing member that exerts a spring bias on the valve stem to help maintain a selected angular position of the valve stem relative to the pressure transducer.

The present invention also relates to a tire pressure monitoring apparatus. The tire pressure monitoring apparatus includes a pressure transducer and a valve stem. A support bracket connects the valve stem to the pressure transducer. The support bracket includes at least a portion that serves as an antenna for the pressure transducer and a portion for providing an electrical connection between the support bracket and a printed circuit board of the pressure transducer.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 2 is an exploded perspective view of the tire pressure monitoring apparatus of FIG. 1;

FIG. 3 is a magnified perspective view of a portion of the tire pressure monitoring apparatus shown in FIG. 1 with certain parts removed for clarity;

FIGS. 4A-4C are perspective views illustrating the assembly of a portion of the tire pressure monitoring apparatus of FIG. 1 with certain parts removed for clarity;

FIGS. 6A and 6B are side views, partially in section, illustrating the tire pressure monitoring apparatus of FIG. 1 mounted to vehicle wheels having different configurations.

DESCRIPTION OF PREFERRED EMBODIMENT

Figure 1:
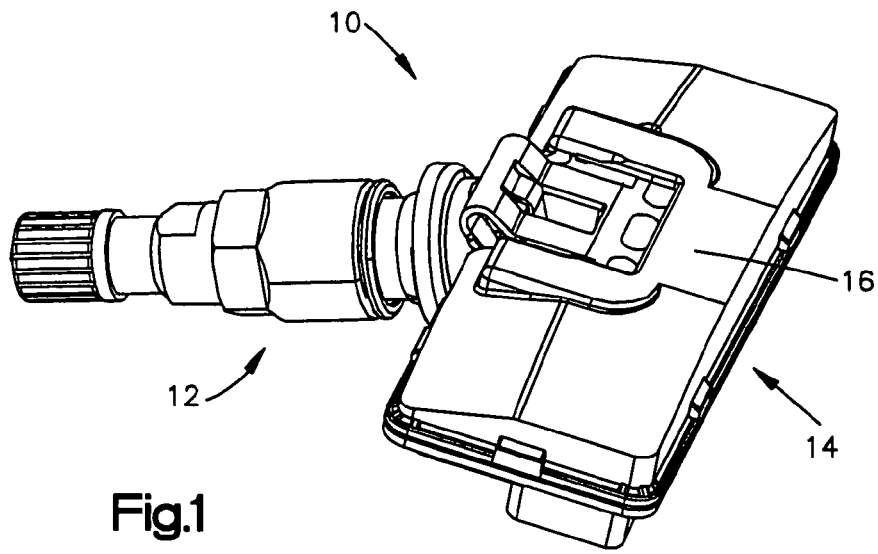
FIG. 1 is a perspective view of a tire pressure monitoring apparatus in accordance with a first embodiment of the present invention.

Referring to FIGS. 1 and 2, according to a first embodiment of the present invention, a tire pressure monitoring ("TPM") apparatus or sensor 10 includes a valve stem 12 and a pressure transducer 14 with a housing 16. The TPM sensor 10 is configured to be mounted on a vehicle wheel 18 (FIGS. 6A and 6B) in a manner described in further detail below. The valve stem 12 includes a valve mechanism (not shown) that allows for selectively inflating or deflating a tire (not shown) mounted on the wheel 18, as known in the art. The pressure transducer 14 is operative to sense the inflation pressure of the tire and provide a signal, indicative of the sensed pressure, to a vehicle mounted apparatus (not shown), such as a controller.

Referring to FIG. 2, the housing 16 of the pressure transducer 14 includes an upper housing part 20 and a lower housing part 22. The apparatus 10 is shown inverted in FIG. 2 so as to illustrate a lower wheel engaging surface 24 of the lower housing part 22. As shown in FIG. 2, the wheel engaging surface 24 has a curved configuration for engaging a vehicle wheel, as described below. The housing 16 may have any construction suited to perform the functions and exhibit the properties described herein. For example, the housing 16 may have a plastic or polymer (e.g., PPA) construction formed by known means, such as injection molding.

The pressure transducer 14 also includes an electronics unit 30 that includes circuitry and components for sensing tire pressure and transmitting a signal for communicating the sensed pressure. The electronics unit 30 may have any construction suited to perform the tire pressure monitoring and signal transmission functions described herein. For example, the electronics unit 30 comprise any known a printed circuit board 32 with components 34 mounted thereon for sensing tire pressure and transmitting a tire pressure signal. The pressure transducer 14 also includes a battery 40 and battery power terminals 42 for providing electrical power to the electronics unit 30.

The pressure transducer 14 also includes a valve stem bracket 50 for connecting the valve stem 12 to the pressure transducer 14 and supporting the valve stem for movement relative to the pressure transducer. Referring to FIGS. 2 and 3, the valve stem bracket 50 has a base portion 52 connectable with the housing 16 of the pressure transducer 14. The connection between the valve stem bracket 50 and the housing 16 may be formed in any known manner. In the illustrated embodiment, as shown in FIG. 2, the base portion 52 of the valve stem bracket 50 is insert molded in the upper housing part 20 of the housing 16. FIG. 3 illustrates the valve stem bracket 50 prior to being insert molded in the upper housing part. Referring to FIG. 3, the base portion 52 of the valve stem bracket 50 may include holes or apertures 54 configured to receive the molten material (e.g., plastic or polymer) of the upper housing part 20 to help improve or bolster the insert molded connection between the parts.

The valve stem bracket 50 also includes a stem support portion 60 that extends transversely from the base portion 52. The stem support portion 60 has a generally curved configuration with a concavely curved stem collar receiving surface 62. A collar receiving aperture 64 extends through the stem support portion 60. A convexly curved valve member receiving surface 66 is positioned opposite the collar receiving surface 62. Reinforcing portions 70 extend laterally from opposite sides of the stem support portion 60 and have respective foot portions 72 configured to overlie corresponding portions of the base portion 52. One of the reinforcing portions includes a portion configured to serve as an electrical terminal or connector 74.

The valve stem bracket 50 further includes a stem biasing portion 80 that extends transversely from the base portion 52. The stem biasing portion 80 has a generally curved configuration with a convex stem collar engaging surface 82 presented facing the stem support portion 60 and, particularly, the collar receiving aperture 64. The stem collar engaging surface 82 is aligned generally centrally with the collar receiving aperture 64. The stem biasing portion 80 includes a central slot 84 that extends centrally and longitudinally along the curved contour of the stem biasing portion.

The valve stem bracket 50 may be constructed of any material suited to perform the functions and features described herein. For example, the valve stem bracket 50 may be constructed of a nickel plated carbon steel. Also, the valve stem bracket 50 may be formed using any suitable manufacturing technique. For example, the valve stem bracket 50 may have a one-piece construction formed by stamping and bending or otherwise forming the bracket from a piece of stock sheet metal. In one particular configuration, for example, the valve stem bracket 50 may have a stamped construction formed from nickel plated bronze or stainless steel C510 carbon steel having a thickness of about 0.80 millimeters.

Referring to FIG. 2, the valve stem 12 comprises a stem portion 100 that includes a nipple or inlet portion 102 for receiving a tire inflation medium (e.g., compressed air) from a conventional source. The inlet portion 102 includes a removable cap 104. Opposite the inlet portion 102, the valve stem 12 includes a collar portion 110. The collar portion 110 includes a sleeve portion 112 and an annular shoulder portion 114 that extends or otherwise protrudes generally laterally from an outer surface 116 of the sleeve portion. The collar portion 110 has a central aperture 120 through which a valve member 122 of the valve stem 12 protrudes. The valve member 122 has a generally T-shaped configuration with a base-member portion 124 and a cross-member portion 126. The valve member 122 has a central aperture 128 through which the tire inflation medium may be directed. The valve stem 12 has a longitudinal axis 106 along which the components of the valve stem, i.e., the stem portion 100, inlet portion 102, cap 104, collar portion 110, sleeve portion 112, shoulder portion 114, and valve member 122 may be aligned.

A terminal end surface 130 of the collar portion 110 extends annularly around the central aperture 120. The end surface 130 has a generally curved configuration with a radius of curvature that is equal or about equal to the radius of curvature of the stem collar receiving surface 62 of the stem support portion 60. The cross-member 126 of the valve member 122 has a lower or bottom surfaces 132 positioned on opposite sides of the base member 124. The bottom surfaces 132 have generally curved configurations with a radius of curvature that is equal or about equal to the radius of curvature of the end surface 130. As shown in FIG. 2, the bottom surfaces 132 of the valve member 122 are spaced from and presented facing toward the end surface 130 of the collar portion 110. The valve member 122 and collar portion 110 are positioned relative to each other such that the bottom surfaces 132 and the end surface 130 are spaced generally equidistantly throughout their respective radiuses of curvature, thus defining a curved channel 134 for receiving the support portion 60 of the valve stem bracket 50 as described below.

To assemble the pressure transducer 14, the battery 40 is assembled with the power terminals 42 and the assembly is press-fit into the upper housing part 20. The electronics unit 30 is then press-fit into the upper housing part 20 such that the battery terminals 42 engage corresponding terminal receiving structures (not shown) in the electronics unit, such as plated-through holes in the printed circuit board 32. Also, when the electronics unit 30 is press-fit into the upper housing part 20, the antenna terminal 74 of the valve stem bracket 50 engages a corresponding terminal receiving structure (not shown) in the electronics unit, such as plated-through holes in the printed circuit board 32. The lower housing part 22 is then positioned overlying the upper housing part in 20 and the two housing parts are laser welded together. To this end, as shown in FIG. 2, the upper housing part 20 may include an annular rim portion 26 becomes molten and fuses or welds the housing parts 20 and 22 together when laser energy is applied.

Once the pressure transducer 14 assembled as described above, the valve stem 12 is connected to the assembled transducer (see FIG. 1), particularly to the valve stem bracket 50, to complete assembly of the apparatus 10. To simplify the description of how this is achieved, FIGS. 4A-4C show the valve stem 12 and valve stem bracket 50 alone, with the remaining parts of the pressure transducer 14 omitted, for clarity. As shown in FIG. 4A, the valve stem 12 is aligned axially with the collar receiving aperture 64 of the stem support portion 60 of the valve stem bracket 50. The valve stem 12 is moved axially, i.e., in a direction generally parallel to the axis 106 until the valve member 122 passes through the collar receiving aperture 64, as shown in FIG. 4B.

Referring to FIG. 4B, as the valve member 122 passes through the collar receiving aperture 64, an upper surface 136 of the valve member, opposite the bottom surfaces 132, is brought into engagement with the stem biasing portion 80 of the valve stem bracket 50. As this occurs, the terminal end surface 130 of the collar portion 110 is brought into engagement with the collar receiving surface 62 of the valve stem support portion 60. As the valve stem 12 is urged into the valve stem bracket 50, the stem biasing portion 80 bends or otherwise deflects and thus urges a spring bias on the valve stem, particularly on the valve member 122.

With the valve stem 12 inserted through the collar receiving aperture 64 against the bias of the stem biasing portion 80, the valve stem 12 is rotated about the axis 106, as indicated generally by the arrow A in FIG. 4C, to the position shown in FIG. 4C. To achieve the position of FIG. 4C, the valve stem 12 may be rotated about ninety degrees (90°). The valve stem 12 may be rotated either clockwise or counterclockwise about the axis 106.

In the assembled condition of FIG. 4C, the bottom surfaces 132 of the valve member cross member 126 engage the valve member receiving surface 66 of the stem support portion 60. The concavely curved bottom surfaces 132 and the convexly curved valve member receiving surface 66 are sized (e.g., radiused) and configured to mate with each other in a generally continuous manner. Similarly, in the assembled condition of FIG. 4C, the end surface 130 of the collar portion 110 engages the collar receiving surface 62 of the stem support portion 60. The convexly curved end surface 130 and the concavely curved collar receiving surface 62 are sized (e.g., radiused) and configured to mate with each other in a generally continuous manner.

It will thus be appreciated that the stem support portion 60 of the valve stem bracket 50 is positioned in the curved channel 134 defined between the collar portion 110 and the valve member 122. The curved configurations of the channel 134 and the stem support portion 60 are selected so that the parts mate with each other so as to provide a relatively close and tight fit. To facilitate this fit, the valve member 122 may be supported in the stem portion 100 for axial movement relative to the stem portion against a spring biasing member (not shown) internal to the valve stem 12. The valve member 122 may thus be spring biased toward the collar portion 110. As a result, in the assembled condition of FIG. 4C, a spring biased clamping force may be exerted on the stem support portion 60. This spring clamping force may be overcome when the valve stem 12 is rotated about the axis 106 during assembly, thus permitting the valve member 122 to move axially away from the collar portion 110 to permit the required rotational movement of the valve stem relative to the valve stem bracket 50. This same spring biasing force may thus create a "snapping" action that pulls the components together to the assembled condition of FIG. 4C.

Figure 5A:
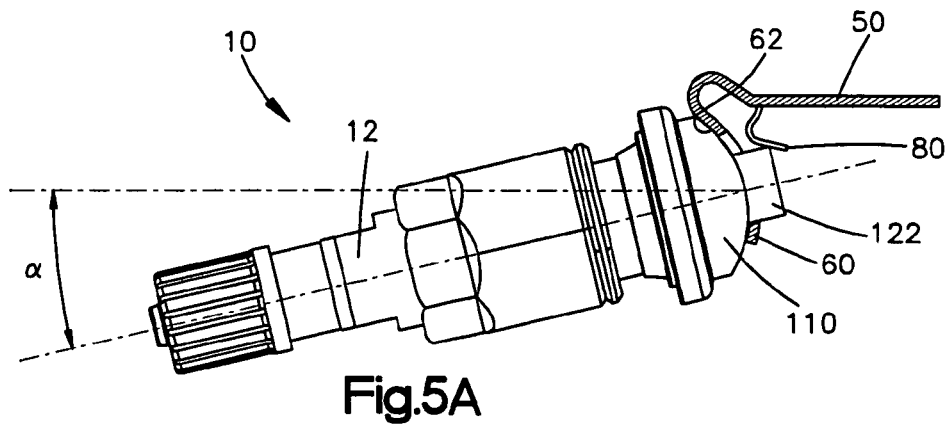
FIGS. 5A and 5B are side views of a portion of the tire pressure monitoring apparatus in an assembled condition illustrating different relative positions of the portions with certain parts removed for clarity.
Figure 5B:
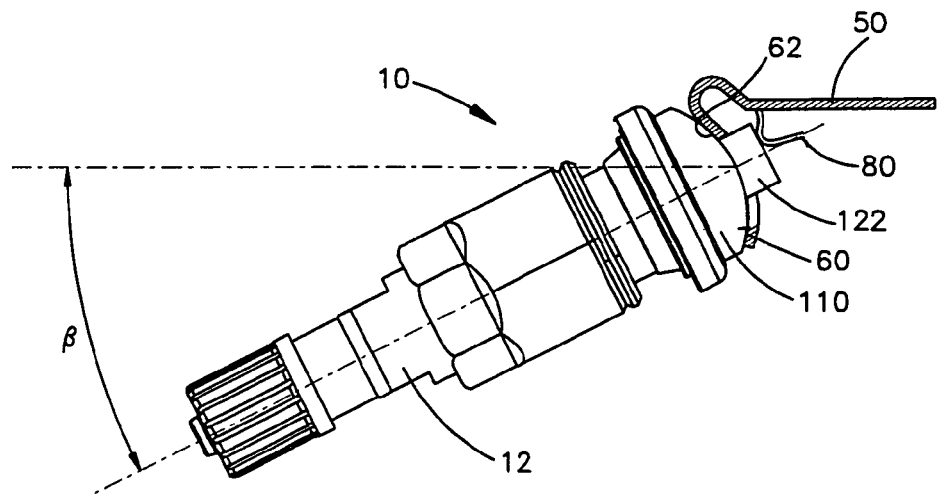

Referring to FIGS. 5A and 5B, according to the present invention, the TPM sensor 10 is configured such that the valve stem 12 can pivot relative to the pressure transducer 14. To simplify the description of this function, FIGS. 5A and 5B show the valve stem 12 and valve stem bracket 50 alone, with the remaining parts of the pressure transducer 14 omitted, for clarity.

As shown in FIGS. 5A and 5B and described above, the connection between the valve stem 12 and the valve stem bracket 50 is formed at least partially by a clamping engagement in which the stem support portion 60 is clamped between the collar portion 110 and the valve member 122. This connection is also formed at least partially by the stem biasing portion 80, which also biases the valve member 122 against the valve member receiving surface 66. In this configuration, the valve stem 12 and valve stem bracket 50 may pivot relative to each other between opposite extremes as shown in FIGS. 5A and 5B. In FIG. 5A, the valve stem 12 and the valve stem support bracket 50 are positioned at a relatively small angle α. In FIG. 5A, the valve stem 12 and the valve stem support bracket 50 are positioned at a relatively large angle β.

The degree of relative pivoting movement between the valve stem 12 and the valve stem support bracket 50 is determined at least partially through the configuration of the collar receiving aperture 64. The engagement between the base-member portion 124 (see FIG. 2) of the valve member 122 and the opposite edges of the collar receiving aperture 64 determine the minimum (α) angle and maximum (β) angle positions between the valve stem 12 and the valve stem bracket 50. It will thus be appreciated that the minimum (α) angle and maximum (β) angle positions can be selected through the configuration of the valve stem support bracket 50, particularly the stem support portion 60 and the collar receiving aperture 64. For example, in one particular configuration, the TPM sensor 10 may be configured for a minimum (α) angle position of about 19° and maximum (β) angle of about 43°.

The degree of spring bias exerted by the stem biasing portion 80 on the valve member 122 may be selected to provide a desired tightness or resistance in moving the valve stem relative to the pressure transducer 14. The materials used to construct the engaging portions of the valve stem 12 and the valve stem bracket 50 also may be selected to provide a desired degree of frictional resistance to movement as well as a desired degree of wear resistance. Because the collar portion 110 is received by and slides on the collar receiving surface 62 of the step support portion 60, the materials used to form the collar portion and the valve stem bracket 50 may be selected to exhibit a desired degree of friction with each other, which helps determine the tightness or resistance against which the valve stem 12 moves relative to the pressure transducer 14. Also, the valve member 122, sliding against the stem biasing portion 80, may also be constructed of a material that exhibits a desired degree of friction with each other, which helps determine the tightness or resistance against which the valve stem 12 moves relative to the pressure transducer 14. For example, in one configuration, the collar portion 110 may be constructed of aluminum, the valve stem bracket 50 may be constructed of carbon steel, and the valve member 122 may be constructed of polymer or plastic material. Additionally or alternatively, the ease or resistance of angular adjustment between the valve stem 12 and the pressure transducer 14 may be controlled via the use of anti-friction coatings.

Figure 6B:
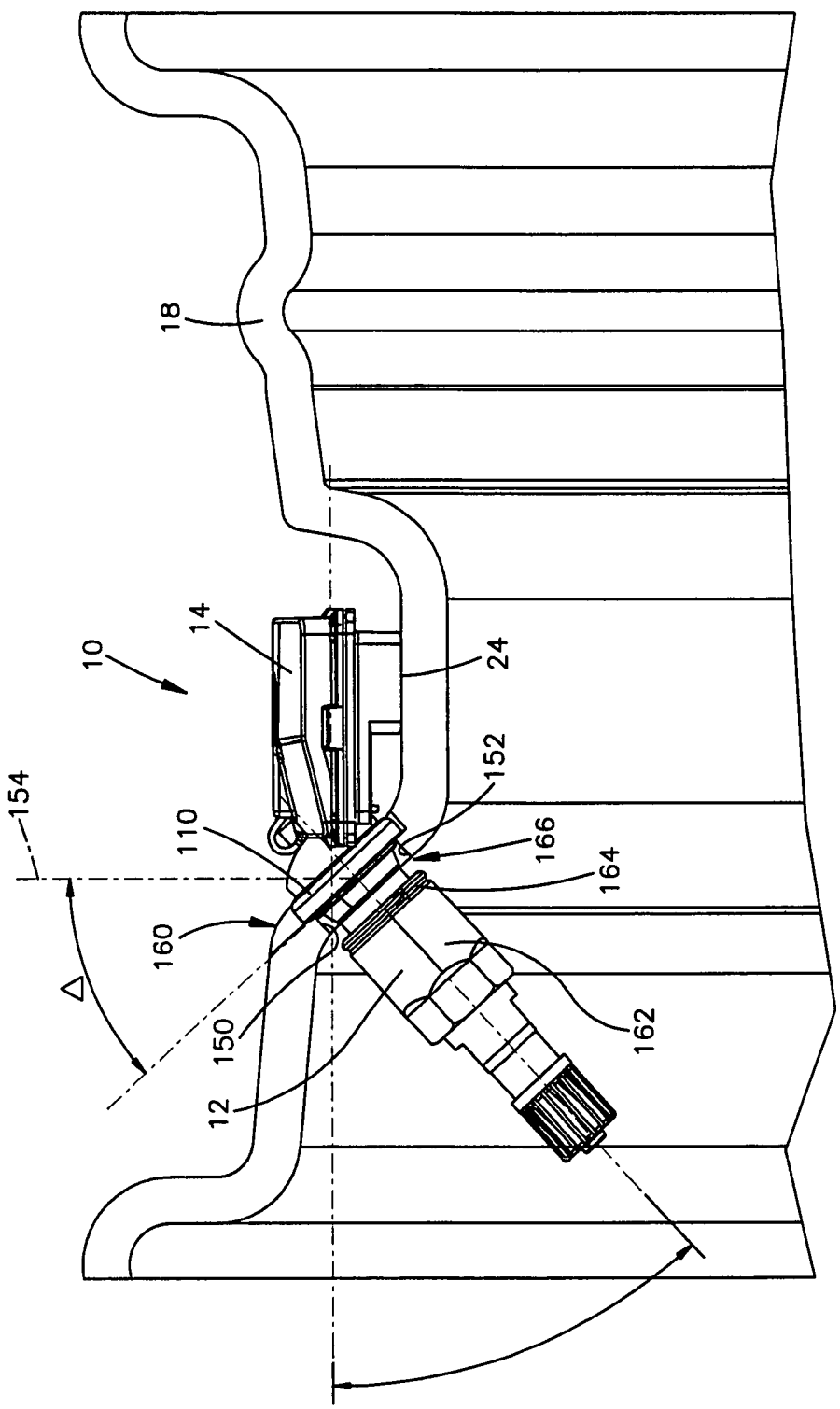

Referring to FIGS. 6A and 6B, the angular adjustability between the valve stem 12 and the pressure transducer 14 allows for fitting TPM sensor 10 to vehicle wheels 18 having different configurations. In FIGS. 6A and 6B, the wheels 18 each have a valve stem opening 150 that extends through a wheel wall 152. The wheel wall 152 extends at an angle Δ relative to a vertical or radial axis 154 of the wheel 18. In the configuration of FIG. 6A, the angle Δ is ten degrees (10°). In the configuration of FIG. 6B, the angle Δ is thirty-three degrees (33°).

The TPM sensor 10, being infinitely adjustable between the extreme positions of FIGS. 5A and 5B, can easily be adapted to either of the configurations of FIGS. 6A and 6B and, for that matter, to a wheel having any configuration between these extremes. Those skilled in the art will thus appreciate that the TPM sensor 10 may be adjusted to facilitate its use with a limitless number of wheel configurations. Those skilled in the art will further appreciate that the TPM sensor 10 can be configured to accommodate wheel configurations with valve stem openings 150 having angles Δ of greater than 33° or less than 10°.

To assemble the TPM sensor 10 to the wheel 18, the valve stem 12 is inserted through the valve stem opening 150 from an inner surface 160 of the wheel. A threaded nut 162 is then installed on a threaded outer surface 164 of the valve stem 12 that protrudes from an outer surface 166 of the wheel 18. The nut 162, when tightened, helps exert a clamping force on the wheel 18 such that the wheel is clamped between the nut and the collar portion 110 of the valve stem 12. To help form an air-tight and moisture-tight seal, an O-ring or washer (not shown) may be installed between the outer wheel surface 166 and the nut 162 and a grommet (not shown) may be installed between the inner wheel surface 160 and the collar portion 110. The O-ring could be formed integrally or attached to the nut 162 and the grommet could be formed integrally with or attached to the collar portion 110 of the valve stem 12.

With the nut 162 installed to secure the TPM sensor 10 to the wheel 18, the pressure transducer 14 can be pivoted relative to the valve stem 12 so that the wheel engaging surface 24 rests against the wheel 18. The curved configuration of the wheel engaging surface 24 is selected such that the pressure transducer housing 16 firmly engages the wheel 18. As the nut 162 is installed, the valve stem 12 is drawn through the opening 150. As this occurs, the valve member 122 is urged into engagement with the stem support portion 60 of the bracket 50. As the nut 162 is tightened, the stem support portion 60 becomes clamped between the valve member 122 and the wheel 18, thereby blocking relative pivotal movement between the valve stem 12 and the pressure transducer 14.

The frictional engagement between the stem support portion 60 and the valve stem 12 is sufficient to maintain the relative angular positions of the valve stem and the pressure transducer 16 during installation of the TPM sensor 10. The frictional engagement between the stem support portion 60 and the valve stem 12 may also be sufficient to maintain the relative angular positions of the valve stem and the pressure transducer 14 under conditions experienced during use of the vehicle (not shown) upon which the wheel 18 is installed. This frictional engagement therefore may be sufficient to maintain the pressure transducer 16 positioned against the wheel 18 as shown in FIGS. 6A and 6B under conditions experienced during use of the vehicle upon which the wheel is installed.

The TPM sensor 10 of the present invention has several features that provide distinct advantages over other wheel-mounted pressure monitors. As described above, the upper and lower housing parts 20 and 22, being laser welded together, provides moisture-tight seal that protects the electronics unit 30. This eliminates the need to use potting materials to seal the electronics unit 30 against moisture. Advantageously, this eliminates potential hurdles or obstacles that the use of potting materials create. For example, potting materials are applied in a molten state and, as such, can create problems due to heat transfer to the electronics unit 30. Potting materials also can create radio frequency (RF) interference problems. Further, potting materials can add significant mass to TPM sensors, which increases the centrifugal forces acting on the sensor during wheel rotation.

Also, as shown in FIG. 2, the battery power terminals 42 and the antenna terminal 74 comprise compliant pin connectors 44. The compliant pins 44 provide a non-soldered electrical connection with the electronics unit 30 when connected as described above during assembly of the TPM sensor 10. Advantageously, the compliant pins 44 eliminate the manufacturing step of soldering connections between the electronics unit 30 and the battery terminals 42 and antenna terminal. This helps save time and helps reduce manufacturing costs and also helps eliminate the potential for problems, such as burning or heating problems, that can be associated with soldered components.

From the above description of the invention, those skilled in the art will perceive improvements, changes and modifications. Such improvements, changes and modifications within the skill of the art are intended to be covered by the appended claims.

Having described the invention, the following is claimed:

1. A tire pressure monitoring apparatus comprising:
a pressure transducer;
a valve stem; and
a support bracket that connects the valve stem to the pressure transducer, the support bracket facilitating pivotal movement between the valve stem and the pressure transducer and comprising a valve stem biasing member that exerts a spring bias on the valve stem to maintain the valve stem at an angular position relative to the pressure transducer that is selected manually by the user from a plurality of selectable positions prior to installing the apparatus on the vehicle wheel.

2. The tire pressure monitoring apparatus recited in claim 1, wherein the spring bias maintains the selected angular position of the valve stem relative to the pressure transducer via friction between the valve stem and the pressure transducer, the friction resulting from the spring bias exerted on the valve stem by the biasing member.

3. The tire pressure monitoring apparatus recited in claim 1, wherein the valve stem is adapted for insertion in an opening in a vehicle wheel, the pressure transducer comprising portions that engage the vehicle wheel and support the pressure transducer, the spring bias exerted on the valve stem by the valve stem biasing member maintaining the portions of the pressure transducer engaging the vehicle wheel while the apparatus is assembled to the vehicle wheel.

4. The tire pressure monitoring apparatus recited in claim 1, further comprising a threaded fastener for securing the apparatus to a vehicle wheel, the threaded fastener when installed causing the support bracket to become clamped between portions of the valve stem to block relative angular movement between the valve stem and the pressure transducer, thereby fixing the angular position of the valve stem relative to the pressure transducer manually selected by the user.

5. The tire pressure monitoring apparatus recited in claim 1, wherein the pressure transducer comprises:
a printed circuit board;
sensor electronics mounted on the circuit board;
a battery power source for supplying electrical power to the sensor electronics; and
battery terminals for establishing an electrical connection between the battery power source and the printed circuit board, the battery terminals comprising compliant pin connectors.

6. The tire pressure monitoring apparatus recited in claim 1, wherein the support bracket is insert molded with a housing of the pressure transducer.

7. The tire pressure monitoring apparatus recited in claim 1, wherein the pressure transducer comprises a housing for supporting sensor electronics, the housing comprising first and second housing parts laser welded together to form a seal that isolates the sensor electronics from ambient conditions outside the housing.

8. The tire pressure monitoring apparatus recited in claim 1, wherein the support bracket comprises at least a portion that serves as an antenna and a portion for providing an electrical connection between the support bracket and a printed circuit board of the pressure transducer, the portion for providing an electrical connection comprising a compliant pin.

9. The tire pressure monitoring apparatus recited in claim 1, wherein the support bracket comprises at least a portion that serves as an antenna and a portion for providing an electrical connection between the support bracket and a printed circuit board of the pressure transducer.

10. The apparatus recited in claim 1, wherein the support bracket comprises a stem support portion having a curved surface for receiving a curved end surface of a collar portion of the valve stem, the curved end surface of the collar portion mating with and sliding along the curved surface of the stem support portion as the valve stem pivots relative to the pressure transducer.

11. The apparatus recited in claim 1, wherein the valve stem biasing member is biased into engagement with the valve stem which creates a frictional engagement between the valve stem and the valve stem biasing member, the frictional engagement maintaining the selected angular position of the valve stem relative to the pressure transducer.

12. The apparatus recited in claim 1, wherein the support bracket comprises a stem support portion having a surface for receiving an end surface of a collar portion of the valve stem, the end surface of the collar portion sliding along the surface of the stem support portion as the valve stem pivots relative to the pressure transducer, the stem support portion comprising an aperture through which a portion of the valve stem extends, the aperture defining the extents to which the valve stem is permitted to pivot relative to the pressure transducer.

13. The apparatus recited in claim 12, wherein the portion of the valve stem that extends through the aperture comprises a portion that engages a surface of the stem support portion opposite the surface that engages the collar portion of the valve stem.

14. The apparatus recited in claim 13, wherein the portion of the valve stem that engages the surface opposite the surface that engages the collar portion is spring biased into engagement with the stem support portion to create a clamping force that clamps the valve stem to the stem support portion, the clamping force being overcome when the valve stem is pivoted relative to the pressure transducer.

* * * * *